United States Patent [19]

Lane et al.

[11] Patent Number: 4,906,268

[45] Date of Patent: Mar. 6, 1990

[54] HEATING OVEN FOR PREPARING OPTICAL WAVEGUIDE FIBERS

[75] Inventors: Kenneth R. Lane, Wilmington, N.C.; Donald L. Prusha, Painted Post; William E. Siebold, Horseheads, both of N.Y.

[73] Assignee: Corning Incorporated, Corning, N.Y.

[21] Appl. No.: 189,360

[22] Filed: May 2, 1988

Related U.S. Application Data

[62] Division of Ser. No. 824,136, Jan. 30, 1986, Pat. No. 4,741,748.

[51] Int. Cl.[4] .................. C03B 23/04; C03B 37/02
[52] U.S. Cl. .................................... 65/18.1; 65/12; 65/13; 65/162; 65/18.3; 65/144; 219/10.55 M; 219/10.77
[58] Field of Search ............ 65/2, 12, 13, 18.1, 65/18.2, 18.3, 32.1, 33, 144, 162, 268; 219/10.75 A, 10.55 M, 10.77

[56] References Cited

U.S. PATENT DOCUMENTS

| | | | |
|---|---|---|---|
| 3,933,454 | 1/1976 | DeLuca | 65/18.2 |
| 4,121,920 | 10/1978 | Balkwill | 65/13 |
| 4,125,388 | 11/1978 | Powers | 65/13 |
| 4,275,095 | 6/1981 | Warren . | |
| 4,307,278 | 12/1981 | Lewis | 219/10.77 |
| 4,410,344 | 10/1983 | Iyengar | 65/13 |
| 4,453,961 | 6/1984 | Berkey | 65/3.12 |
| 4,501,942 | 2/1985 | Lewis | 219/10.77 |
| 4,533,378 | 8/1985 | Paek et al. | 65/3.12 |
| 4,547,644 | 10/1985 | Bair et al. . | |
| 4,579,080 | 4/1986 | Martin et al. . | |
| 4,610,860 | 9/1986 | Mullen . | |
| 4,654,065 | 3/1987 | Naumann et al. | 65/13 |

OTHER PUBLICATIONS

Browell, T. P., "Vitreous Silica for the Scientific Glassblower" The J. of the British Soc. of Sci. Glass, vol. 3, No. 1.

Primary Examiner—David L. Lacey
Assistant Examiner—Lori Ann Johnson
Attorney, Agent, or Firm—Maurice M. Klee

[57] ABSTRACT

A method for consolidating a porous glass preform is provided in which a preform is placed in a stationary elongated chamber and selected portions of the chamber, distributed along the chamber's length, are sequentially heated above the preform's sintering temperature. In certain preferred embodiments, the chamber is surrounded by an elongated susceptor and the heating is performed by moving an induction heating coil along a path parallel to the longitudinal axes of the susceptor and the chamber.

3 Claims, 11 Drawing Sheets

HEATING OVEN FOR PREPARING OPTICAL WAVEGUIDE FIBERS

CROSS-REFERENCE TO RELATED APPLICATIONS

This application is a divisional application of copending U.S. application Ser. No. 824,136, filed Jan. 30, 1986, which issued as U.S. Pat. No. 4,741,748 on May 3, 1988.

BACKGROUND OF THE INVENTION

1. Field of the Invention

This invention relates to optical waveguide fibers, and, in particular, to an improved heating oven for use in preparing such fibers.

2. Description of the Prior Art

Various conventional techniques for preparing optical waveguide fibers involve the use of heating ovens capable of generating temperatures in the range of from about 1000° C. to about 1500° C.

For example, in the outside vapor deposition (OVD) process, a porous glass preform, also referred to as a soot blank, is formed and then placed in a heating oven for drying and consolidation into a transparent glass blank suitable for drawing into an optical waveguide fiber. Drying is accomplished by heating the preform to a temperature of about 1100° C. in the presence of one or more drying gases, such as, a mixture of helium and chlorine. Consolidation is accomplished by heating the dried preform above its sintering temperature, e.g., to a temperature on the order of 1450° C.

In the past, the heating ovens used for drying and consolidation have employed a stationary "hot zone" and a moving blank. More specifically, the ovens have included a cylindrically-shaped muffle, e.g., an alumina muffle, having a length of about 3 meters and an inside diameter of about 12.7 cm. The outside of the muffle has been insulated with, for example, an alumina insulation to minimize heat loss. A heating element, e.g., a resistance heating element, has been placed around the center of the muffle producing a central hot zone, having a length of approximately 26 cm, surrounded on either side by cooler end zones, having lengths of approximately 84 to 99 cm.

Drying has been accomplished within these ovens by introducing the soot preform into the upper section of the muffle and introducing drying gases into the muffle. In some cases, the soot blank has been rotated about its long axis during the drying process. Typically, the soot blank has been kept in the upper section of the muffle for approximately 3 to 4 minutes prior to consolidation.

Consolidation has been performed within these ovens by lowering the soot blank into the hot zone at a rate of approximately 5 mm per minute while the temperature of the hot zone was held at approximately 1500° C. During consolidation, the soot blank may or may not have been rotated, as desired.

These prior art heating ovens have suffered from various disadvantages, the most limiting of which has been the fact that the ovens have been commercially practical only when used to process short blanks, e.g., blanks having a length on the order of 75 cm.

To accommodate both the central hot zone and the cooler end zones, the prior art ovens have required oven muffles having a length on the order of about 3-4 times the length of the longest blank to be processed in the oven. Accordingly, for a 75 cm blank, a 3 meter muffle has been required. Because muffle pieces longer than 1.8 meters have not been available in commercial quantities, three meter muffles have typically been constructed by joining together two muffle pieces, with the joint thereafter being exposed to temperatures no greater than 1100° C., that is, the joints have been kept out of the hot zone.

For a 2 meter blank, as opposed to a 75 cm blank, muffles having a length on the order of 6 meters would be required. Although it is possible to fabricate a 6 meter muffle by joining together three or more muffle pieces, the joining and aligning process is difficult to accomplish, especially in view of the fact that the joint must be gas tight so as to retain the processing gases within the muffle. Also, there is the potential for failure of the muffle at the two or more joints due to the effects of the processing gases and the elevated temperatures employed in drying and consolidating blanks.

In addition to the muffle problems, the application of the prior art heating ovens to the processing of long blanks has raised various other problems. For example, the physical space needed to house a prior art oven capable of processing long blanks, including the oven's muffle, its supporting structure, and the equipment used to insert and remove blanks from the muffle, has quickly become prohibitive with increasing blank size. Thus, for a 75 cm blank, an oven and its associated equipment can be housed in a two-story building. For a 2 meter blank, on the other hand, a three-story building would be needed. This plainly makes for an expensive oven.

Moreover, as the overall length of the oven and its associated apparatus is increased, it becomes substantially more difficult to maintain the requisite control over the movements of the blank. In particular, it becomes difficult to align three stories of apparatus so that a 2 meter blank, can be both rotated and translated along the centerline of a 6 meter muffle.

In addition to their physical limitations, the prior art ovens have also suffered from processing limitations. In particular, due to the stationary hot zone and moving blank, only simple thermal cycles of the types described above for drying and consolidation have been conveniently performed within these ovens.

SUMMARY OF THE INVENTION

In view of the foregoing state of the art, it is an object of the present invention to provide improved heating ovens for use in preparing optical waveguide fibers. More specifically, it is an object of the invention to provide improved heating ovens which can be conveniently used as part of the OVD process to dry and consolidate soot blanks having a length greater than 75 cm. It is a further object of the invention to provide improved heating ovens which can be used to apply thermal cycles of various configurations to glass materials from which optical waveguide fibers are produced.

To achieve the foregoing and other objects, the invention in accordance with certain of its aspects provides a heating oven for processing glass materials from which optical waveguide fibers are prepared comprising:

(a) an elongated chamber for receiving the glass material to be processed; and (b) means for heating the chamber, said means comprising an elongated susceptor, the longitudinal axis of the susceptor being parallel to the longitudinal axis of the chamber, an induction heating coil, means for moving the induction heating coil along a path parallel to the longitudinal axes of the susceptor and the chamber, and means for energizing the induction heating coil.

In accordance with certain preferred embodiments of the invention, the heating oven further includes a sensor for sensing the temperature of the susceptor in the region of the induction heating coil. In certain particularly preferred embodiments, the sensor is a pyrometer which moves with the induction heating coil, the susceptor is surrounded with insulation, and the insulation includes an elongated slot through which the pyrometer senses the temperature of the susceptor. In accordance with other preferred embodiments, the oven also includes a stationary heater at each end of the elongated chamber.

In accordance with still further preferred embodiments, the oven includes means for surrounding the susceptor with an inert atmosphere. In accordance with these embodiments, it is further preferred for the chamber to be in the form of a cylindrical muffle, the susceptor to be in the form of a graphite cylinder which surrounds the muffle, and for the susceptor to be surrounded by a cylindrical envelope, the spaces between the susceptor and the muffle and between the envelope and the muffle being filled with the inert atmosphere. In accordance with these embodiments, it is also preferred to use a silica muffle.

In accordance with other aspects of the invention, the heating oven is used to consolidate porous glass preforms by placing the preform in the oven's chamber and then selectively heating portions of the chamber above the sintering temperature of the preform. In accordance with certain preferred embodiments of these aspects of the invention, the selective heating progresses sequentially along the length of the chamber.

The accompanying drawings, which are incorporated in and constitute part of the specification, illustrate the preferred embodiments of the invention, and together with the description, serve to explain the principles of the invention.

DESCRIPTION OF THE PREFERRED EMBODIMENTS

As described above, the present invention relates to an improved heating oven for use in preparing optical waveguide fibers. In the description that follows, the oven will be illustrated with regard to its use as part of the OVD process for producing optical waveguide fibers. A discussion of that process, and, in particular, the drying and consolidation of porous glass preforms which occurs during the process, can be found in U.S. Pat. Nos. 4,453,961 and 4,125,388, and the patents referred to therein, the relevant disclosures of which are incorporated herein by reference. It is to be understood that the description of the present invention in the foregoing context is for purposes of illustration only and is not to be interpreted as limiting the applicability of the invention to other waveguide forming processes now known or subsequently developed.

Figure 1:
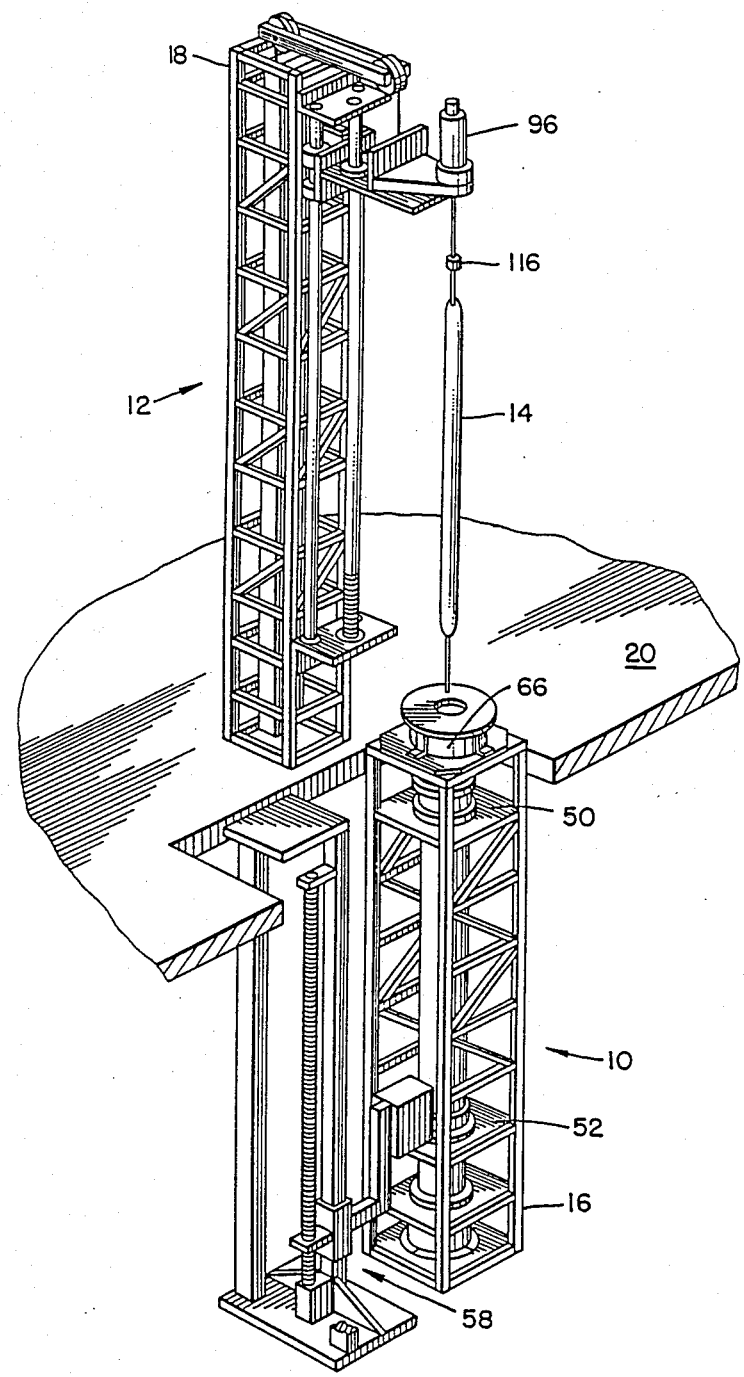
FIG. 1 is a perspective view of a heating oven constructed in accordance with the present invention and its associated apparatus for introducing porous glass preforms into the oven for processing.

Referring now to the figures, there is shown in FIG. 1 a perspective view of a heating oven 10 constructed in accordance with the present invention and its associated downfeed tower 12 which serves to lower porous glass preform 14 into oven 10 and remove it from the oven once drying and consolidation have been completed. Oven 10 and downfeed tower 12 are each approximately one story tall, the supporting structure 16 of the oven being carried by a first, lower floor (not shown) and the supporting structure 18 of the downfeed tower being carried by a second, upper floor 20.

Figure 7:
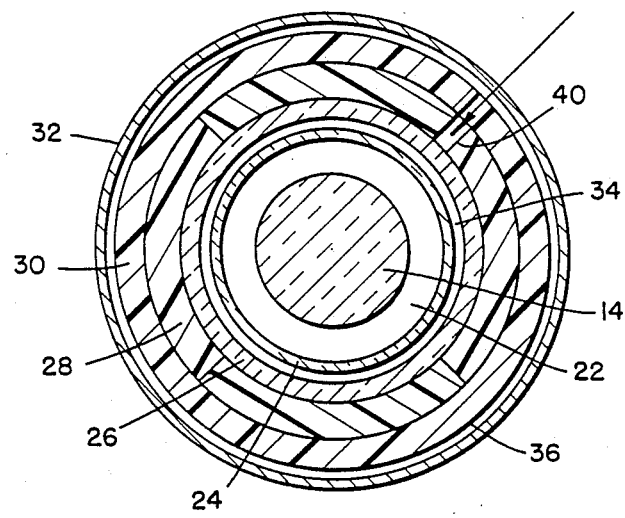
FIG. 7 is a cross-sectional view along lines 7—7 in FIG. 5.

As can best be seen in the cross-sectional view of FIG. 7, when lowered into the oven, preform 14 sits in chamber 22 defined by cylindrical muffle 24. Muffle 24 is preferably made of silica, but can also be made of other materials, such as, alumina, graphite, or other similar materials. For processing glass preforms having a length of approximately 2 meters and a diameter of approximately 12 cm, it has been found convenient to use a muffle having a length of approximately 3.7 meters, an inside diameter of approximately 15 cm, and an outside diameter of approximately 16.5 cm. One piece silica muffles of these dimensions are available in commercial quantities from such suppliers as Verteq Co., U.S. Quartz Division, 17 Madison Road, Fairfield, N.J. 07006.

Surrounding muffle 24 is graphite susceptor 26. A typical susceptor is made of Airco grade 890 RL graphite supplied by Airco Speer Co., St. Marys, Pa. 15857. For ease of assembly, susceptor 26 is preferable composed of a number of sections, e.g., four sections, which sit one on top of another. As discussed below, during use, the susceptor is inductively heated by means of induction heating coil 38 (see, for example, FIG. 2).

As shown in FIG. 7, susceptor 26 is surrounded by inner insulation 28, outer insulation 30, and outer envelope 32. Inner insulation 28 is preferably made of 0.48 gm/cm$^3$ density alumina, outer insulation 30 is preferably made of 0.24 gm/cm$^3$ density alumina, and outer envelope 32 is preferably made of silica, although other materials can be used for each of these components. As discussed below, during use, all voids between muffle 24 and envelope 32, including space 34 between susceptor 26 and muffle 24, and space 36 between outer insulation 30 and envelope 32, are purged with an inert gas, e.g., argon. The purging is done to prevent the graphite susceptor from oxidizing when in its heated state.

Figure 2:
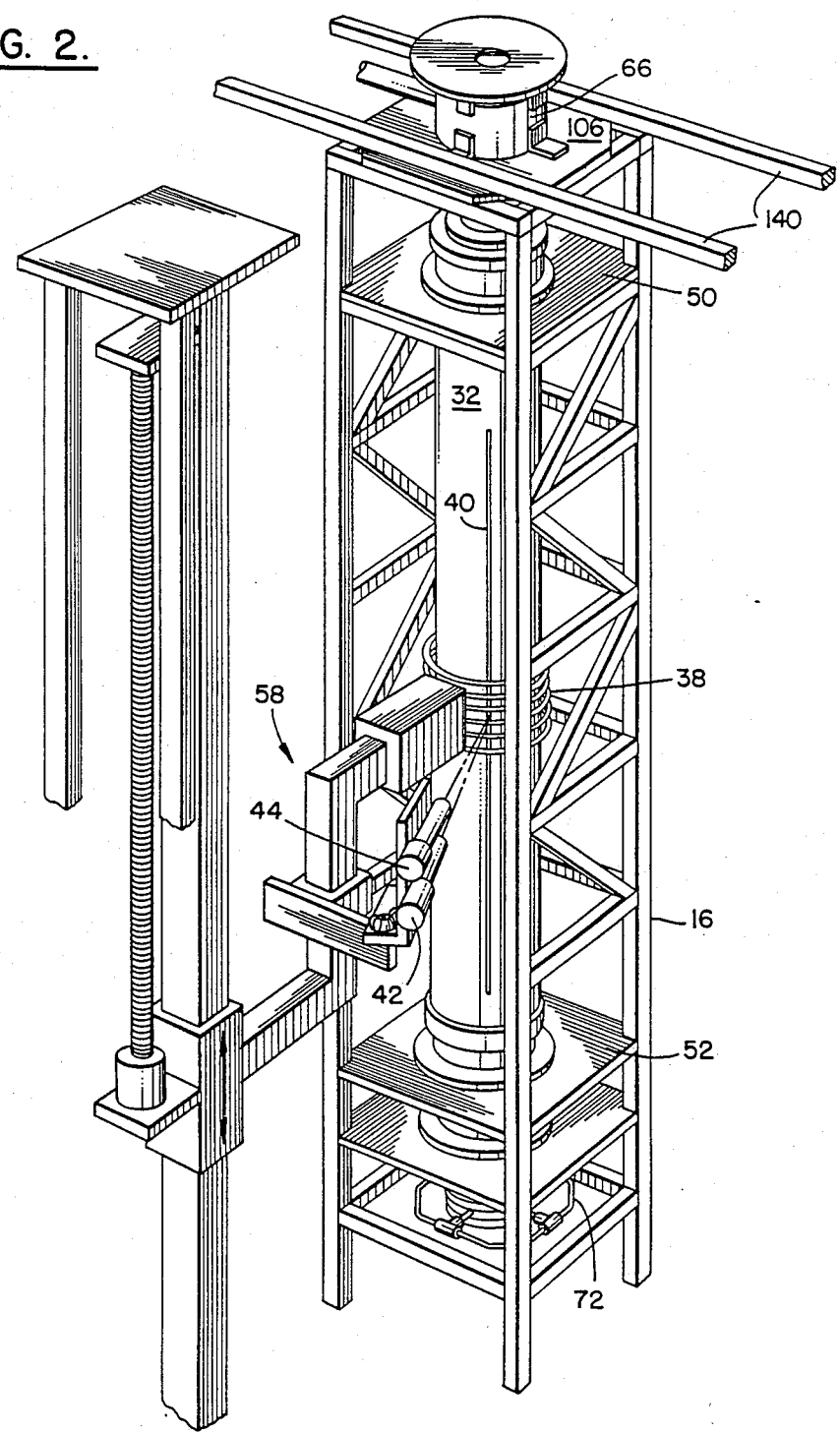
FIG. 2 is a more detailed perspective view of the heating oven of FIG. 1.
Figure 3:
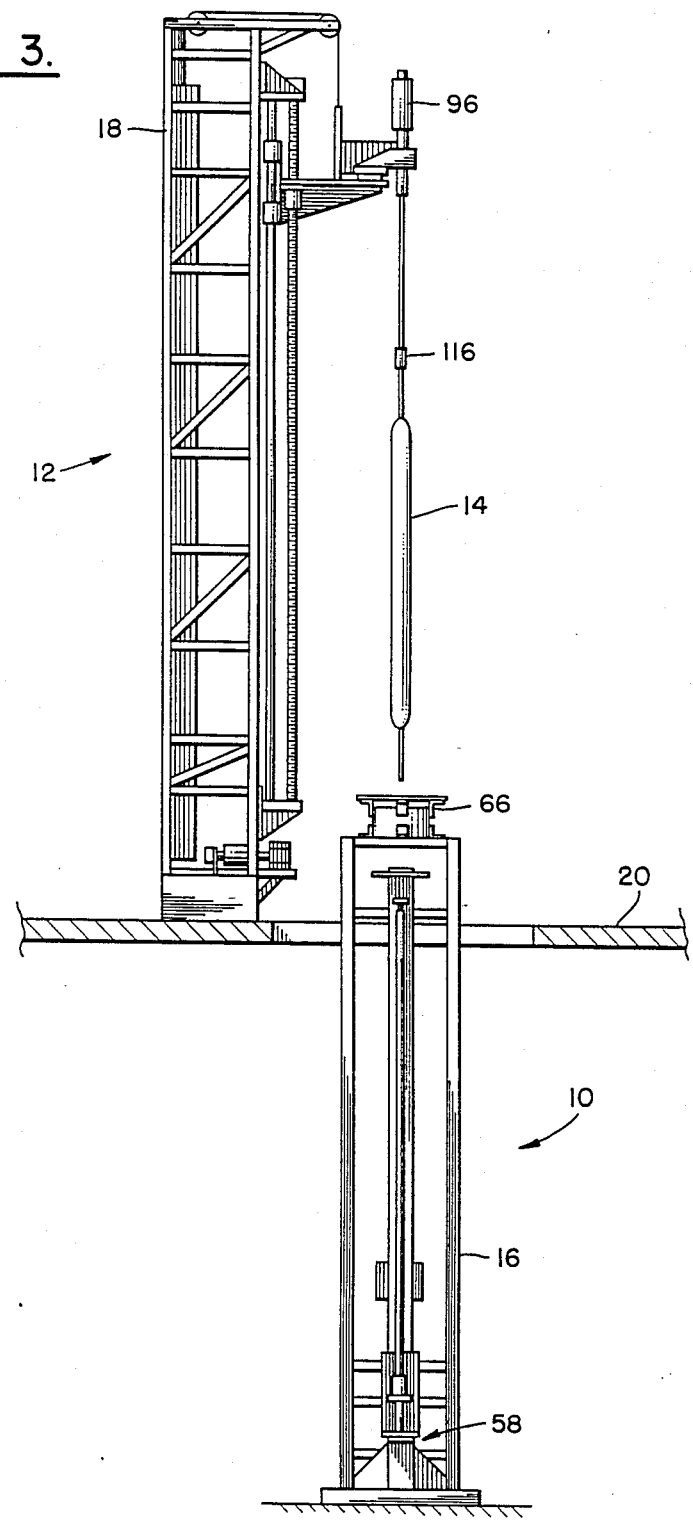
FIG. 3 is a side elevation view of the heating oven and associated apparatus of FIG. 1.
Figure 4:
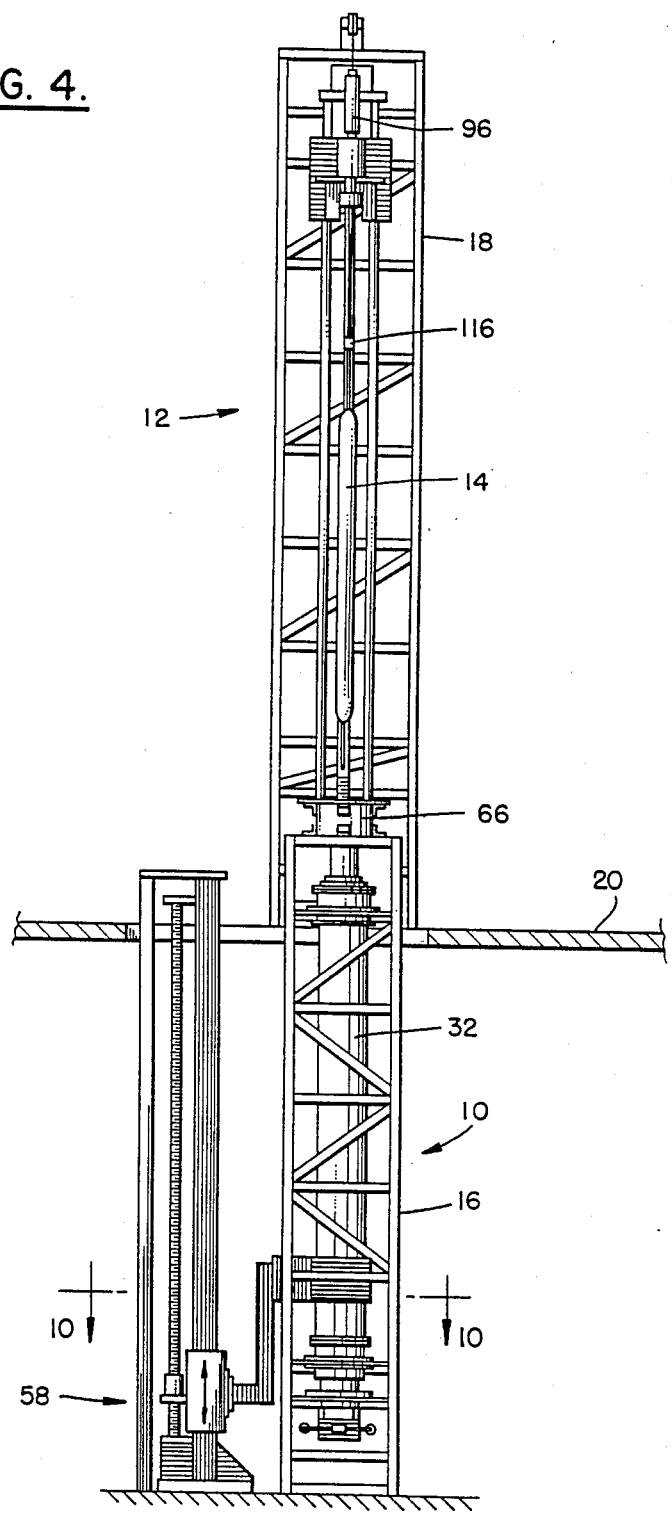
FIG. 4 is a front elevation view of the heating oven and associated apparatus of FIG. 1.
Figure 5:
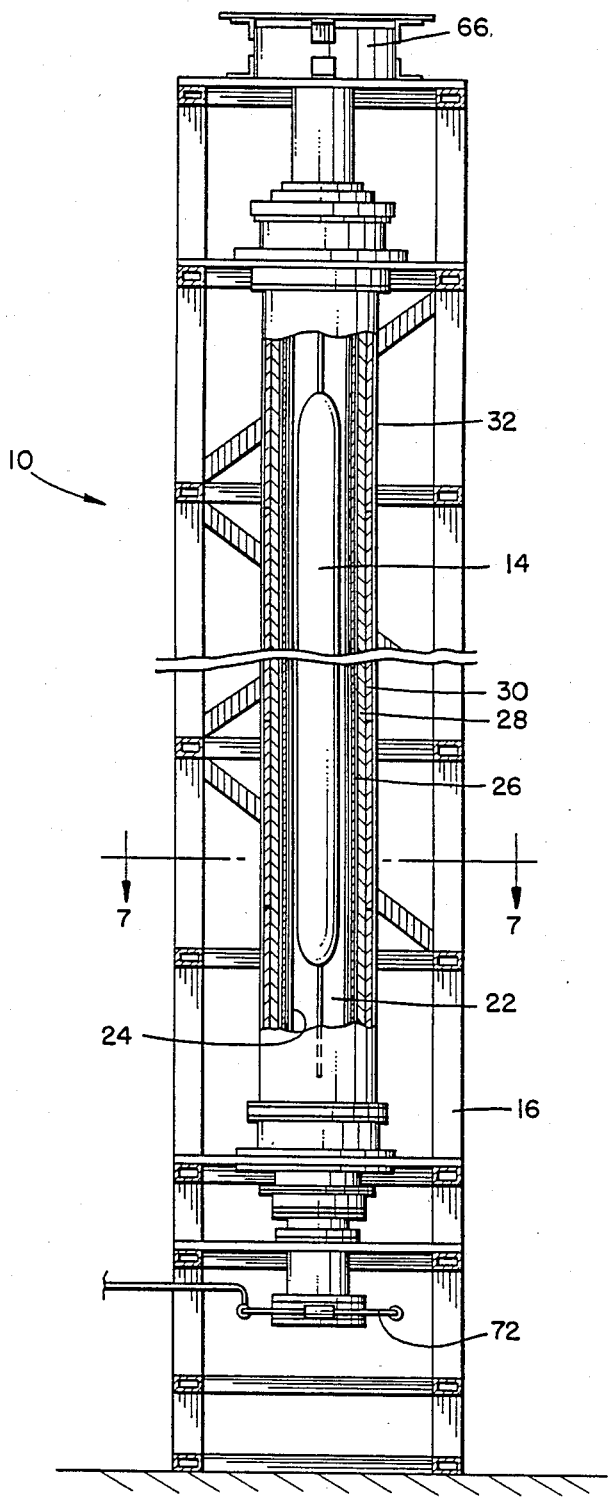
FIG. 5 is a sectional view of the heating oven of FIG. 1.
Figure 12:
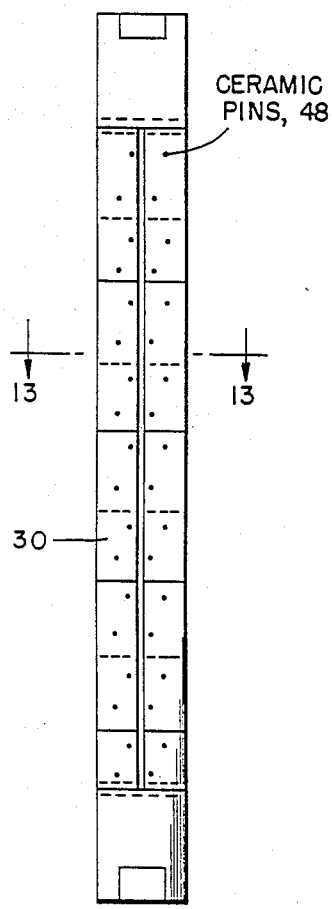
FIGS. 12–15 illustrate a preferred technique for assembling the insulation materials used with the susceptor of the oven of FIG. 1.
Figure 13:
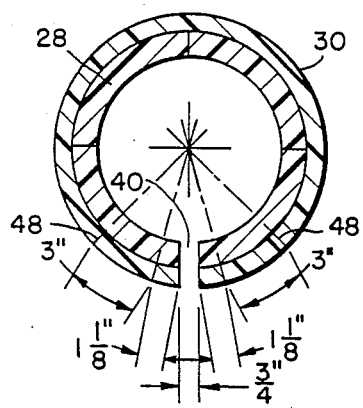

Inner insulation 28 and outer insulation 30 are constructed so as to produce slot 40 by means of which the temperature of susceptor 26 is monitored by pyrometers 42 and 44 (see FIG. 2 and discussion below). Specifically, inner insulation 28 and outer insulation 30 are each formed in sections which sit one on top of another, the joints between the sections of inner insulation 28 being staggered from the joints between the sections of outer insulation 30. As shown in FIGS. 12 and 13, each section of outer insulation 30 is composed of one piece of insulating material, while each section of inner insulation 28 is composed of four pieces of insulating material.

Figure 15:
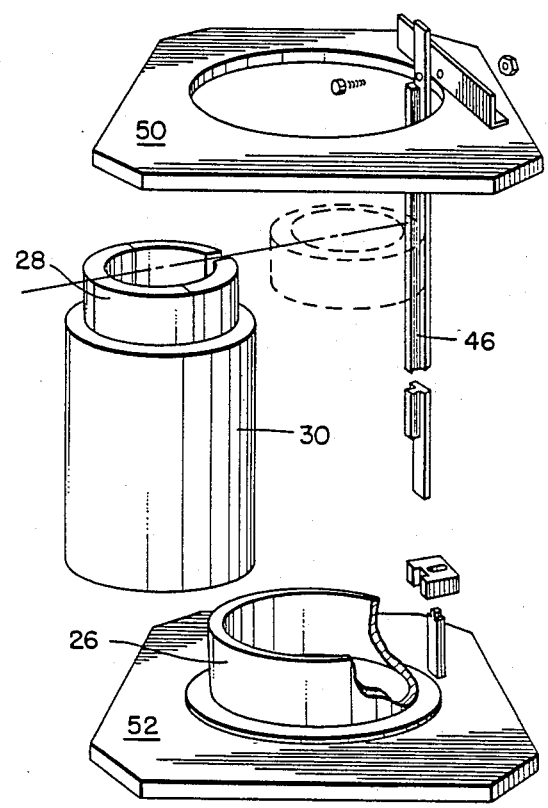
Figure 14:
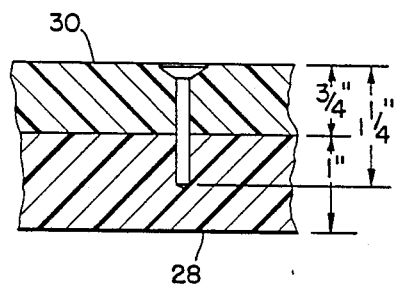

As shown in FIGS. 13 through 15, the inner and outer layers of insulation are assembled and slot 40 is aligned by means of alignment tool 46 and ceramic pins 48. Specifically, tool 46 is attached to support plates 50 and 52, the lowest section of susceptor 26 is set in place, and the inner and outer insulators are placed around the susceptor, aligned by means of tool 46 and pinned in place by means of ceramic pins 48. The process is then repeated until the complete susceptor and surrounding insulation have been assembled.

As illustrated in FIG. 12, it has been found preferable to stagger the locations of ceramic pins 48. In practice, the use of sectioned insulation in combination with pinning of the sections to one another in the region of slot 40 has been found to result in an overall configuration in which slot 40 maintains a relatively constant size and location throughout the thermal cycling of the oven.

Once insulation layers 28 and 30 have been assembled, tool 46 is removed, outer envelope 32 is placed around the outside of outer insulation 30, and muffle 24 is placed within susceptor 26 to complete the assembly shown in FIG. 7. Oven 10 and downfeed tower 12 are then aligned. In particular, muffle 24 and spindle drive 96, which rotates preform 14 during processing, are aligned so that the preform will lie along the centerline of the muffle. This can most conveniently be done by suspending a plumb bob from the spindle and adjusting the position of the spindle relative to the muffle so that the bob lies along the centerline of the muffle.

As illustrated in FIGS. 8–11, oven 10 is heated by means of induction heating coil 38 and upper and lower end heaters 54 and 56. The end heaters are preferably made of graphite and are operated as resistance heaters. They are used to compensate for end losses from the top and bottom of the oven.

Induction heating coil 38 is carried by moveable support structure 58 which moves the coil up and down along the length of the oven at predetermined speeds, e.g., a speed of 7 millimeters/minute during consolidation, to generate the desired temperature profiles within chamber 22. An AC generator (not shown) is used to supply power to coil 38 through a transformer and an appropriate capacitance (not shown). The coil, the capacitance, and the transformer are chosen so that a unity power factor load is presented to the generator and so that the coil will be in resonance at the generator's operating frequency. The coil generates electrical currents in susceptor 26, which heat the susceptor and thus chamber 22. In practice, it has been found that the temperature profiles needed to dry and consolidate porous glass preforms can be produced using a 75 kilowatt solid state generator operating at 10 kilohertz.

Figure 8:
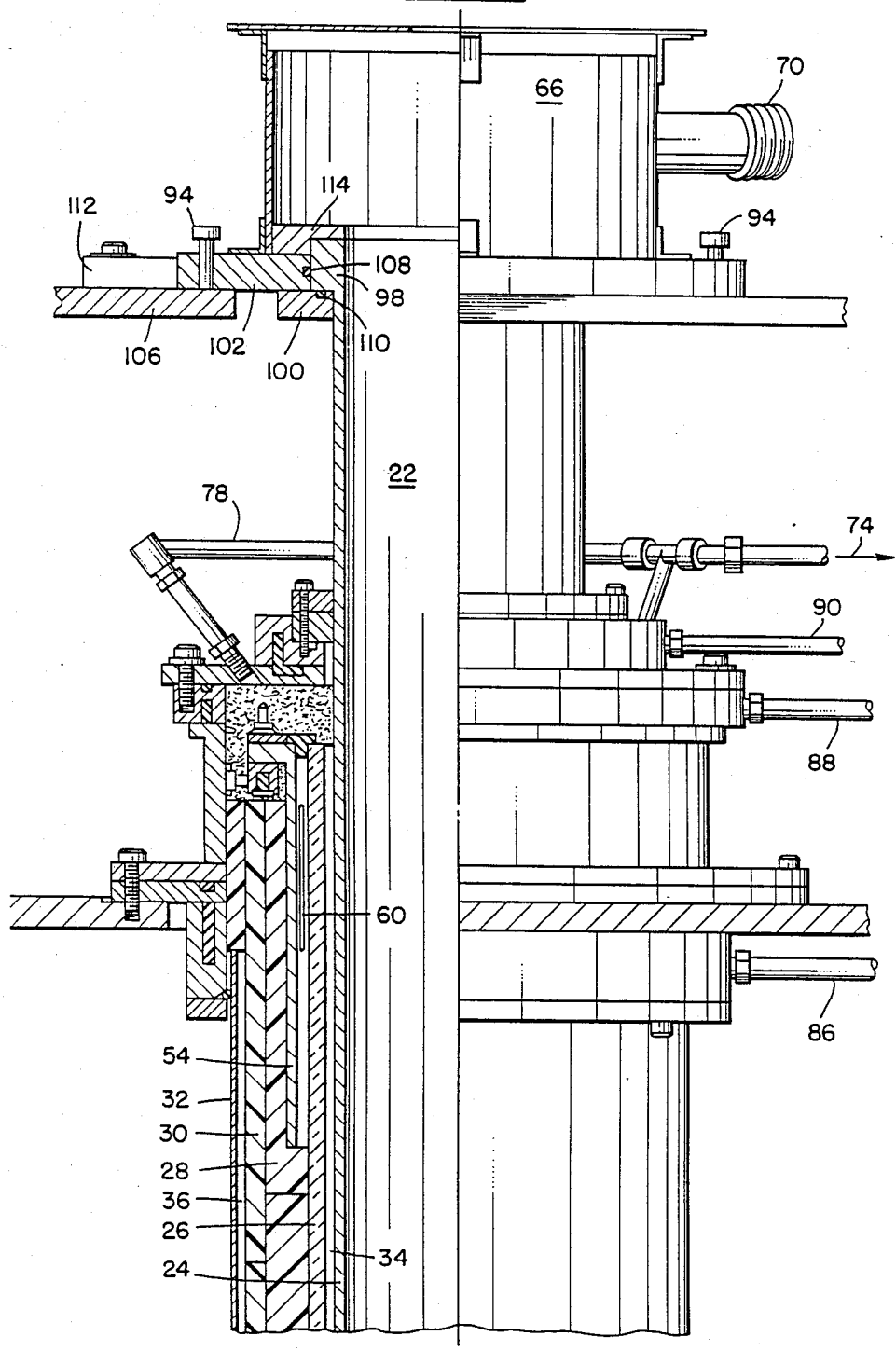
FIG. 8 is a detailed view, partially in cross-section, of the construction of the upper portion of the oven of FIG. 1.
Figure 9:
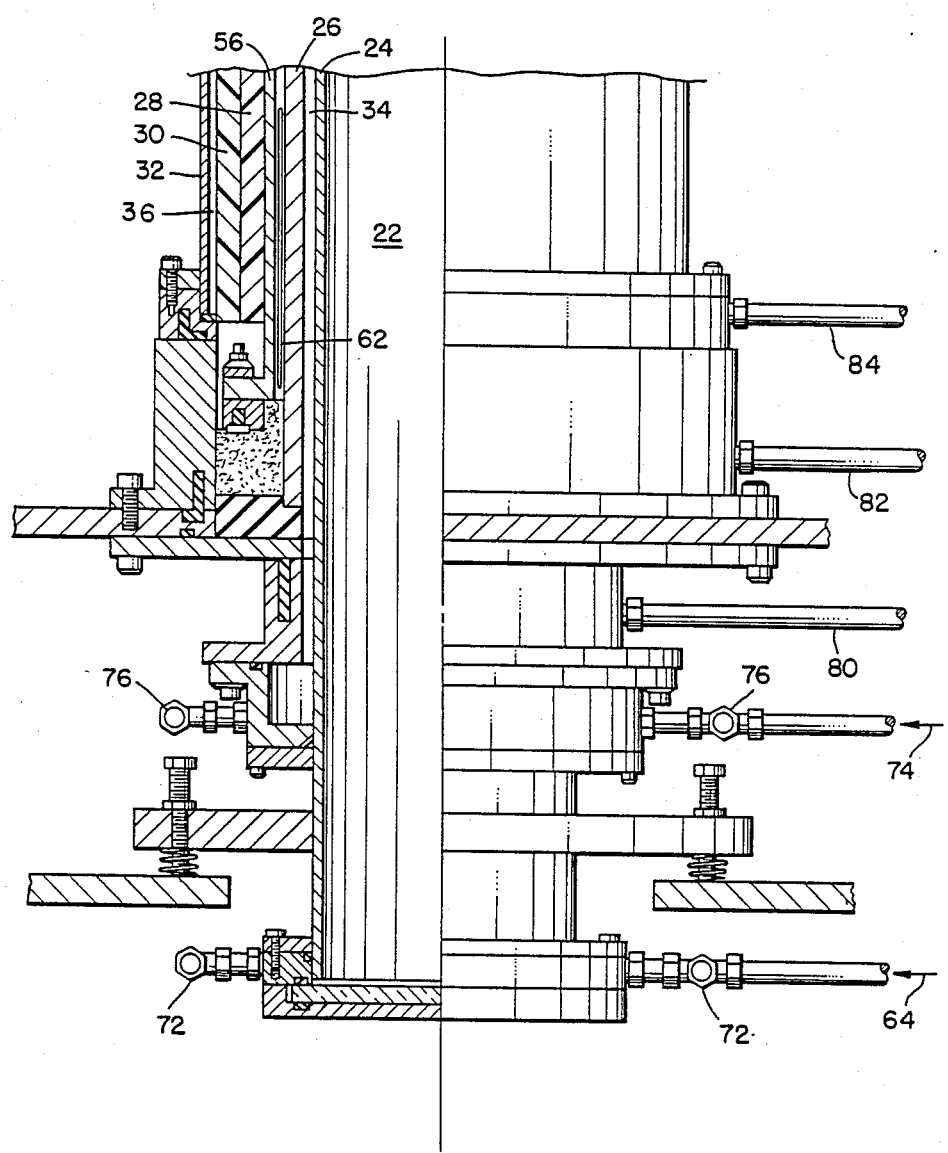
FIG. 9 is a detailed view, partially in cross-section, of the construction of the lower portion of the oven of FIG. 1.
Figure 10:
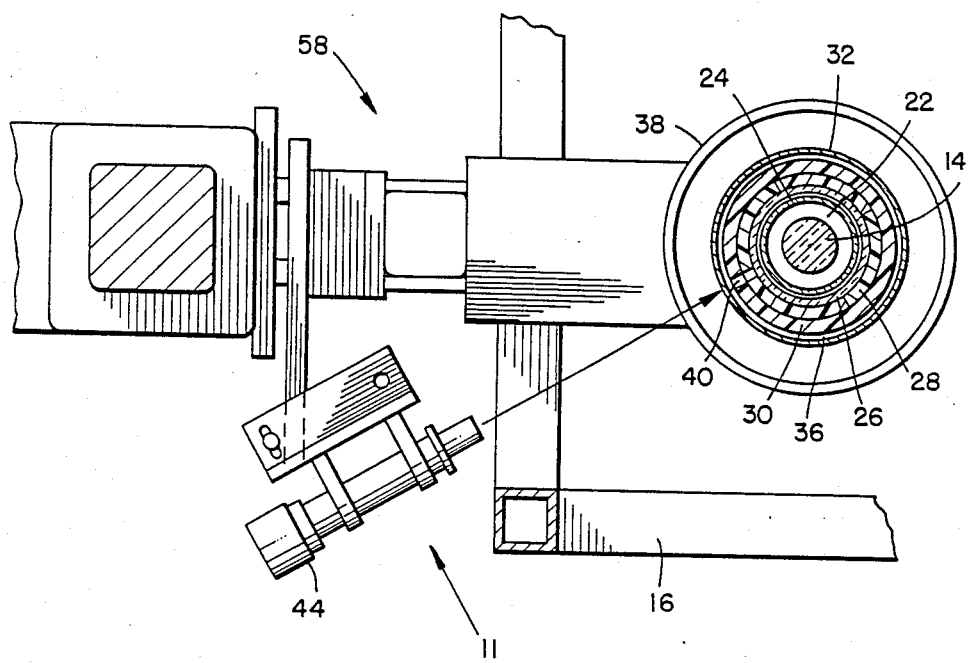
FIG. 10 is a cross-sectional view along lines 10—10 in FIG. 4.
Figure 11:
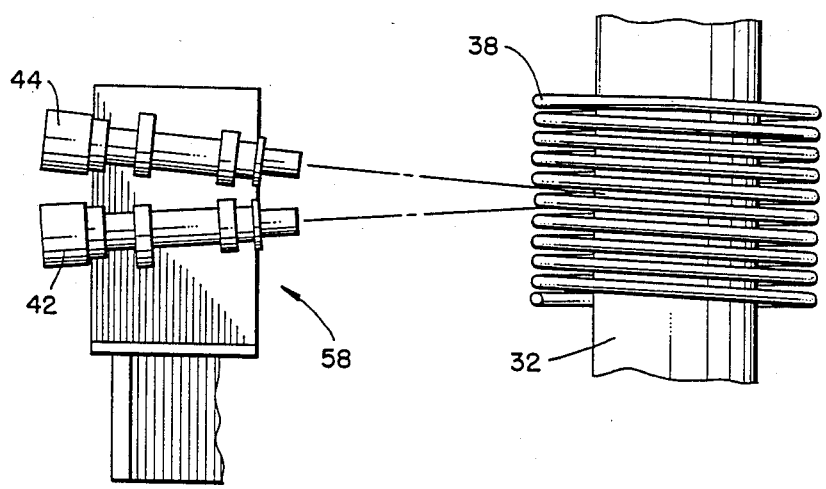
FIG. 11 is a side view of FIG. 10.

Temperature feedback is achieved through the use of pyrometers 42 and 44 and thermocouples 60 and 62 (see FIGS. 8 and 9). The thermocouples are preferably platinum-rhodium type thermocouples, and the pyrometers are preferably single wavelength optical type temperature detectors. The pyrometers are mounted on support structure 58 and thus move in unison with coil 38. By means of transparent outer envelope 32 and slot 40, the pyrometers sense the color, and thus the temperature, of susceptor 26. Although two pyrometers are shown in the figures and are preferred to provide redundancy in the system, it is to be understood that the system can also be operated with a single pyrometer.

A microprocessor (not shown) is used to control the amount of power delivered to coil 38 and end heaters 54 and 56. The microprocessor receives the output of the thermocouples and the pyrometers, and based on those values, adjusts the power delivered to the coil and end heaters so that the desired temperature profiles are achieved within chamber 22.

In practice, it has been found that after a period of use, e.g., after about one month of use, a film tends to collect on the inside surface of envelope 32 in the region of slot 40. This film causes the pyrometers to read low, which, in turn, causes the microprocessor to increase the amount of power delivered to the coil and the end heaters. During drying, temperature control is generally not as critical as during sintering, and thus, this extra heat can usually be tolerated. During sintering, however, where temperature control can be more critical, it has been found preferable in certain cases to use direct power control, rather than feedback control through the pyrometers.

The microprocessor also controls the introduction of processing gases, e.g., nitrogen, helium, oxygen, and chlorine, into chamber 22. As shown diagrammatically in FIG. 6, processing gases 64 enter the bottom of muffle 24 through manifold 72 (see also FIG. 9) and pass out of the muffle through exhaust shroud 66. The processing gases are combined with ambient air 68 in the exhaust shroud before entering exhaust duct 70 which leads to appropriate air pollution control equipment (not shown). The processing gases are supplied to chamber 22 at a pressure and flow rate sufficient to maintain the chamber at a pressure above atmospheric pressure.

Figure 6:
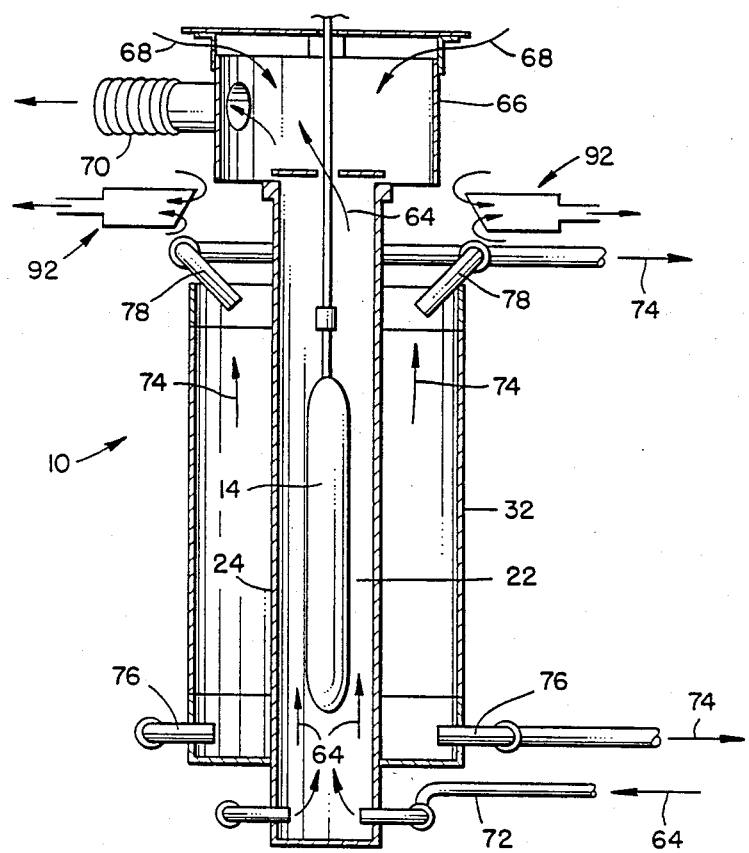
FIG. 6 diagrammatically illustrates the flow of processing gases and purge gases through the oven of FIG. 1.

As also shown in FIG. 6, oven 10 can be provided with hot air exhaust equipment 92 for controlling the ambient temperature surrounding the oven.

As further shown in FIG. 6, purging gas 74 is supplied to and removed from the space between outer envelope 32 and muffle 24 by means of intake manifold 76 and exit manifold 78 (see also FIGS. 8 and 9). As with the processing gases, the purging gases are delivered to suitable air pollution control equipment after passing through the oven.

As discussed above, the purging gas is preferably argon and its purpose is to prevent oxidation of graphite susceptor 26, as well as graphite end heaters 54 and 56. To this end, the carbon monoxide content of the gases leaving manifold 78 is monitored to determine whether oxygen is reaching the susceptor and end heaters notwithstanding the purge. Such a condition can occur, for example, if either muffle 24 or outer envelope 32 should fracture during use. The output of the carbon monoxide monitor is fed to the microprocessor which shuts down the oven if integrity is lost.

In addition to monitoring the carbon monoxide content of the gases leaving through manifold 78, the water content of those gases is also monitored. This is done to determine if cooling water supplied to the various supporting structures for the oven (see lines 80 through 90 in FIGS. 8 and 9) is leaking into the oven. (The cooling water is preferably distilled water and the supporting structures are preferably made of aluminum.) Again, the output of the water content monitor is fed to the microprocessor, and the oven is shut down if integrity is lost.

Figure 16:
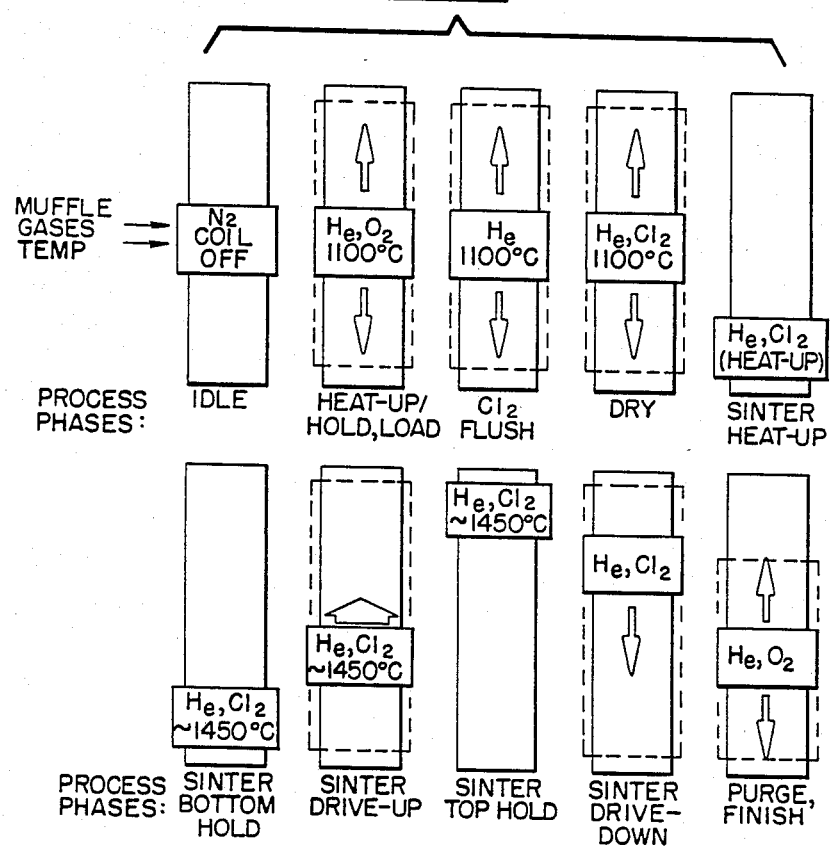
FIG. 16 diagrammatically illustrates the use of the oven of the present invention to dry and sinter porous glass preforms produced by the OVD process.

FIG. 16 diagrammatically illustrates a preferred sequence of operations to dry and consolidate porous glass preforms using the oven of the present invention. In FIG. 16, the long rectangular box symbolizes oven 10 and the small rectangular box symbolizes moving induction heating coil 38.

The "idle" phase shown in the first panel of FIG. 16 represents the state of the oven during a partial or total shutdown. Coil power is off and end heater power is set to produce a temperature of, for example, approximately 1150° C. in the vicinity of thermocouples 60 and 62. (Conveniently, a set point of about 1050° C. for the temperature of thermocouples 60 and 62 is used for the other process phases shown in FIG. 16.) Chamber 22 and the space between the muffle 24 and outer envelope 32 are purged with argon. Similarly, the feed lines (not shown) for bringing processing gases, e.g., chlorine, to manifold 72 are purged with nitrogen. Cooling water is supplied to the supporting structures for the oven through lines 80 through 90, and heat is removed from the oven's surroundings by exhaust equipment 92.

To bring the oven up to processing temperature, power is supplied to coil 38 during the "heat-up/hold" phase shown in panel 2 of FIG. 16. During this phase, the coil oscillates over the total length of the oven at a rate of, for example, 1250 millimeters/minute when moving upward, and a rate of, for example, 2300 millimeters/minute when moving downward. The setpoint for pyrometers 42 and 44 during this phase can be, for example, approximately 1100° C. During the phase, a mixture of helium and oxygen is supplied to chamber 22 through manifold 72 and removed though exhaust shroud 66. As in the "idle" phase, as well as in the remaining phases shown in FIG. 16, argon is supplied to the space between muffle 24 and outer envelope 32 through manifold 76 and removed through manifold 78, cooling water is supplied to the oven's supporting structure through lines 80 through 90, and heat is removed from the oven's surroundings by exhaust equipment 92. The heat-up process is continued until the desired holding temperature of the oven, e.g., 1100° C., is achieved. The oven is then ready to dry and consolidate a glass preform.

During the heat-up process, muffle 24 expands longitudinally. The system used to support muffle 24 at its upper end is designed to compensate for this expansion.

Specifically, as shown in FIG. 8, muffle flange 98 is supported by muffle support split ring 100, which is attached to muffle flange ring 102. Muffle flange ring 102 includes jacking bolts 94 which contact support plate 106. As shown in FIG. 2, support plate 106 is attached to support members 140 which, in turn, are attached to the building housing the oven (attachment not shown). In this way, the supporting structure for the upper end of muffle 24 is substantially thermally independent of the supporting structure for the remainder of the oven.

As muffle 24 expands away from support plate 106, the jacking bolts are adjusted so that split ring 100 continues to support the muffle. Similarly, when the muffle is cooled, the jacking bolts are adjusted to compensate for the contraction of the muffle. Because support plate 106 is attached to the building housing the oven, rather than to the oven's support frame 16, the expansion and contraction of the muffle can be compensated for independently of the expansion and contraction of the support frame.

As also shown in FIG. 8, the muffle support system includes muffle flange braces 112 for locating muffle 24 laterally to cause the muffle's centerline to coincide with the soot blank centerline, muffle flange protection ring 114 which covers, and thus protects, the top surface of flange 98, 0-ring 110 at the junction of flange 98 with split ring 100, and 0-ring 108 at the junction of flange 98 with flange ring 102. The components making up the muffle support system, except for 0-rings 108 and 110, are preferably made of aluminum. The 0-rings are preferably made of a fluorocarbon compound, such as, for example, Viton or the like, so as to be able to withstand the high temperatures to which muffle 24 is heated.

In practice, when using silica muffles, it has been found preferable to avoid cooling muffles, which have been subjected to temperatures above 1050° C. for substantial periods of time, to temperatures below about 600° C. This is because vitreous silica slowly and irreversibly undergoes a phase change to become beta-cristobalite at temperatures above 1050° C. See T. P. Browell and G. Hetherington, "Vitreous Silica for the Scientific Glassblower," *The Journal of the British Society of Scientific Glassblowers,* Vol. 3, No. 1, (1964), pages 1–12.

Beta-cristobalite and vitreous silica have similar expansion coefficients at elevated temperatures so that thermal stresses do not develop in the muffle as long as the muffle is kept hot. As the muffle cools, however, beta-cristobalite changes to alpha-quartz (at 570° C.) and/or alpha-cristobalite (at 270° C.). The expansion coefficients of these forms of silica are significantly different from the expansion coefficient of vitreous silica. Accordingly, due to these phase transitions, it has been found that silica muffles which have been heated above 1050° C. for substantial periods of time generally fracture upon cooling. As indicated above, the preferred solution to this problem is to keep silica muffles hot, e.g., at a temperature of about 600° C. or greater, preferably about 1100° C., once they have been put into use.

The phase change from vitreous silica to beta-cristobalite has been found to be of benefit in terms of allowing the oven to be run at the high temperatures needed for consolidation. Specifically, the 1450° C. temperature used for consolidation is below the melting point of beta-cristobalite, but is in the range in which vitreous silica softens. As a consequence, it has been found that muffles having larger quantities of beta-cristobalite on their inside surfaces are less subject to deformation during consolidation than muffles with smaller amounts of beta-cristobalite.

Even after relatively large amounts of beta-cristobalite have formed on the inside surface of the muffle, deformations of muffle 24 can occur at the temperatures used for consolidation. In accordance with the present invention, these deformations, as well as the deformations which can occur before substantial devitrification has taken place, are controlled through the use of the muffle support system described above (i.e., jacking bolts 94, support plate 106, and support members 140) and by adjusting the pressure on the outside of the muffle, i.e., the pressure in the space between envelope 32 and muffle 24, to be essentially equal to the pressure inside the muffle. This can conveniently be done by, for example, measuring the pressure in muffle 24 during, for example, the sintering phase, monitoring the pressure in exit manifold 78, and adjusting the flow rate into intake manifold 74 so that the pressure in the exit manifold is essentially equal to the pressure measured in the muffle. In practice, the pressure in muffle 24 during sintering is on the order of 0.01 to 0.2 inches of water above atmospheric pressure, and accordingly, the set point for the pressure in exit manifold 78 is set within this range.

Referring again to FIG. 16, after the "heat-up/hold" phase has been completed, the "load" phase can be entered wherein preform 14 is attached to handle 116 and lowered into chamber 22 by means of downfeed tower 12. During the "load" phase, oven 10 continues to operate as in the "heat-up/hold" phase, the setpoint for pyrometers 42 and 44 being, for example, approximately 1100° C.

Once loading has been completed, the "Cl₂ flush" phase is entered wherein the nitrogen gas in the feed lines (not shown) leading to manifold 72 is replaced with chlorine gas. This replacement can typically take about 1 minute. During this phase, the flow of oxygen to manifold 72 is stopped, so that at the end of the phase, the processing gases entering chamber 22 are helium and chlorine.

After the "Cl₂ flush" phase, the oven enters the "dry" phase during which the water content of the preform is reduced prior to consolidation. This phase can typically take on the order 20 minutes. Throughout this phase, chamber 22 is filled with a mixture of helium and chlorine gas, preform 14 is rotated at a rate of, for example, 7 rpm by spindle drive 96, and coil 38 oscillates over the full length of the oven at a rate of, for example, 1250 millimeters/minute when moving upward and a rate of, for example, 2300 millimeters/minute when moving downward. The temperature of the oven during this phase is, for example, 1100° C.

After the "dry" phase has been completed, the oven enters the "sinter" or consolidation phase which includes a "heat-up" stage, a "bottom hold" stage, a "drive-up" stage, a "top hold" stage, and a "drive-down" stage (see FIG. 16).

Coil 38 is located at the bottom of the oven during the "heat-up" stage, and power is supplied to the coil until pyrometers 42 and 44 measure a susceptor temperature of, for example, about 1400° C. During the "bottom hold" stage, the coil remains stationary and sinters the tip of the preform, the temperature at the bottom of the oven reaching approximately 1450° C. during this stage. Next, during the "drive-up" stage, the coil moves upward at a rate of, for example, 7 millimeters/minute and progressively heats portions of chamber 22 above the sintering temperature of the preform. Thereafter, during the "top hold" stage, the top of the preform is sintered. Finally, the oven enters the "drive-down" stage during which coil 38 moves to the bottom of the oven at a rate of, for example, 2300 millimeters/minute. During this stage, the set point for pyrometers 42 and 44 can be, for example, approximately 1100° C. Throughout each of these stages, chamber 22 is filled with a mixture of helium and chlorine, and preform 14 is rotated by spindle drive 96 at a rate of, for example, 7 rpm. In total, the sintering phase for a 2 meter preform can take on the order of about 5 hours.

After sintering has been completed, the oven enters the "purge" phase during which the coil oscillates over the lower portion of the oven to reheat this area. The flow of chlorine gas into chamber 22 is turned off, and the chamber is purged with a mixture of helium and oxygen for a period of, for example, 5 minutes. Once the chlorine gas has been purged, the oven enters the "finish" phase during which the consolidated preform is removed from chamber 22. The coil continues to oscillate over the lower portion of the oven for a period of, for example, 15 minutes during which the lower portion is heated to approximately 1000° C. and the upper portion cools to approximately the same temperature. The oven then returns to the "heat-up/hold" phase to await drying and consolidation of the next preform.

Although specific embodiments of the invention have been described and illustrated, it is to be understood that modifications can be made without departing from the invention's spirit and scope. For example, the heating oven of the present invention can be used to subject glass preforms to drying and sintering procedures other than those illustrated herein. More generally, by means of its moving induction heating coil and its end heaters, the oven of this invention can be used to create a variety of thermal profiles for processing glass materials from which optical waveguide fibers are prepared.

What is claimed is:

1. A method for consolidating a porous glass preform comprising the steps of:
   (a) placing a porous glass preform in a stationary elongated chamber; and
   (b) sequentially heating a plurality of selected portions of the chamber above the sintering temperature of the preform so as to consolidate the preform, said portions being spatially distributed along the length of the chamber.

2. The method of claim 1 wherein the plurality of selected portions of the chamber are heated above the sintering temperature of the preform in sequence beginning with portions associated with one end of the chamber and progressing across the length of the chamber to portions associated with the other end of the chamber.

3. The method of claim 2 wherein at least part of the chamber is surrounded by a stationary elongated susceptor, the longitudinal axis of the susceptor being parallel to the longitudinal axis of the chamber, and the plurality of selected portions of the chamber are heated by moving an energized induction heating coil, which surrounds a portion of the susceptor, along a path parallel to the longitudinal axes of the stationary susceptor and the stationary chamber.

* * * * *